W. KIESER.
VALVE.
APPLICATION FILED OCT. 1, 1908.
998,695.
Patented July 25, 1911.
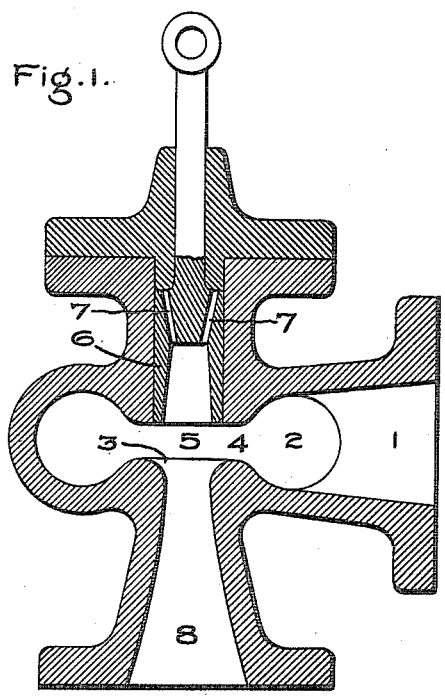
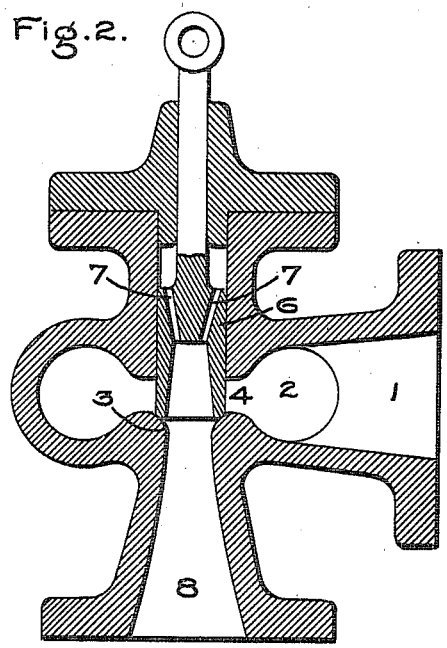
Witnesses:
Marcus L. Byng.
J. Ellis Glen.
Inventor:
Walter Kieser,
by Albert G. Davis
Att'y.

UNITED STATES PATENT OFFICE.

WALTER KIESER, OF BERLIN, GERMANY, ASSIGNOR TO GENERAL ELECTRIC COMPANY, A CORPORATION OF NEW YORK.

VALVE.

998,695.   Specification of Letters Patent.   Patented July 25, 1911.

Application filed October 1, 1908. Serial No. 455,696.

*To all whom it may concern:*

Be it known that I, WALTER KIESER, a citizen of Switzerland, residing at Berlin, Germany, have invented certain new and useful Improvements in Valves, of which the following is a specification.

This invention relates to valves for controlling the flow of elastic fluid, such as steam, and its object is to reduce to a minimum the reactive effect upon the mechanism for regulating the position of said valve, in order that a directly-acting regulator may be employed. To this end, the diameter of the valve is made as small as possible, and the valve-seat is so constructed as to produce a high speed in the stream of fluid passing through, even when the valve is wide open. If this speed is created gradually by means of what may be called a convergent annular nozzle leading to the valve-seat, and then converted again gradually into pressure in a divergent or expanding nozzle leading away from said valve, only slight pressure losses will occur when the valve is fully open, notwithstanding the high speed and the small seat.

In the accompanying drawing, Figure 1 is a longitudinal section of a valve employing my invention, the valve being shown wide open, and Fig. 2 is a similar view showing the valve closed.

The elastic fluid enters the valve casing through the inwardly converging nozzle 1 into an annular receiver 2 concentric with the valve-seat 3. From this receiver the fluid flows through a constricted annular mouth 4 to the central chamber 5 in which the valve 6 is located. Said valve is preferably tubular and of small diameter. It is balanced in any suitable manner, as for instance by having longitudinal perforations 7 through which the fluid can have access to the upper side of said valve.

In the small control chamber the velocity of the fluid can be greatly increased, approaching even to that of sound velocity, *i. e.* about 450 meters per second. From said chamber it passes to the outwardly diverging outlet tube 8, in which the velocity is changed into pressure.

The exceedingly small valve causes only a small reaction on the valve casing, and the converging nozzle and diverging outlet prevent any great pressure losses.

What I claim as new and desire to secure by Letters Patent of the United States, is,

1. A valve for controlling the flow of fluid comprising a converging inlet nozzle which converts pressure into velocity, a diverging outlet nozzle which converts velocity into pressure, said nozzle having its axis at right angles to the axis of the inlet nozzle, an annular receiver surrounding the entrance to the diverging nozzle into which receiver the converging nozzle opens, a valve seat adjacent the entrance to the diverging nozzle, a cylindrical valve coöperating with the seat and having its axis in alinement with the axis of the diverging nozzle, and a stem for the valve which projects outwardly from the side of the valve opposite to the seat, there being a passage through the valve for balancing the pressures thereon.

2. A valve for controlling the flow of fluid comprising a flanged inlet, a flanged outlet, said inlet and outlet being of substantially the same size, a converging nozzle passage leading from the inlet, a diverging nozzle passage leading to the outlet and having an inlet that is smaller than the first mentioned inlet, an annular chamber adjacent the entrance to the diverging nozzle passage and communicating therewith, the converging nozzle passage also opening into said chamber through a passage smaller than the first mentioned inlet, a circular valve seat surrounding the opening between one of the nozzle passages and said chamber, a cylindrical valve coöperating with the seat and having its axis in alinement with the axis of said nozzle passage, a stem for the valve which projects outwardly from the side of the valve opposite the seat, and means for balancing the pressures on the valve.

In witness whereof, I have hereunto set my hand this 8th day of September, 1908.

WALTER KIESER.

Witnesses:
 FRIEDRICH GANZERT,
 OTTO SCHMIDT.